UNITED STATES PATENT OFFICE.

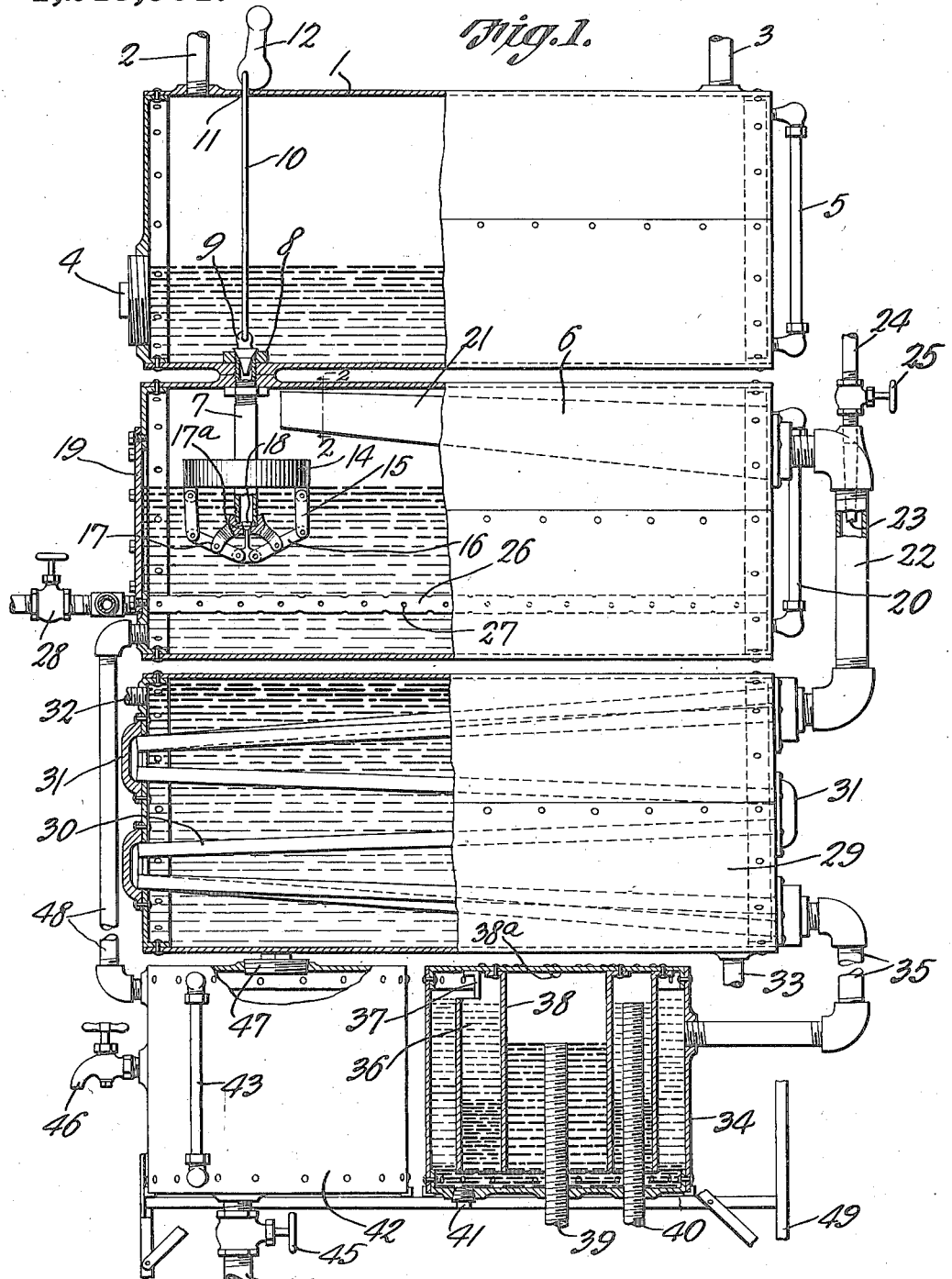

JOHN J. TOKHEIM, OF CEDAR RAPIDS, IOWA.

PROCESS OF PURIFYING FLUIDS.

1,248,951.

Specification of Letters Patent.

Patented Dec. 4, 1917.

Application filed March 30, 1916. Serial No. 87,732.

*To all whom it may concern:*

Be it known that I, JOHN J. TOKHEIM, a citizen of the United States, residing at Cedar Rapids, in the county of Linn and State of Iowa, have invented a new and useful Process of Purifying Fluids, of which the following is a specification.

It is the object of this invention to provide a novel process whereby gasolene and like volatile liquids which are used for cleaning garments, etc., may be purified by vaporization and subsequent condensation, suitable steps being included whereby the vapor is washed.

The process contemplates caring for the condensate, separating the condensate from the washing water, producing proper movement of the vapor through a condensing means, regulating the supply of impure liquid, caring for the water of condensation resulting from the steam whereby the liquid is vaporized; automatically replacing the water of condensation by impure liquid, and disposing of the impurities.

The drawings show one of the many instrumentalities whereby the herein disclosed process may be carried out, and structural changes may be made in the apparatus without jeopardizing the utility of the process as claimed.

In the drawings:—

Figure 1 is a side elevation of an apparatus adapted to carry out the process disclosed, parts appearing in section;

Fig. 2 is a fragmental section on the line 2—2 of Fig. 1.

In the drawings, there is shown a supply tank 1, equipped with an inlet 2 and having a vent 3. At one end, the supply tank 1 is provided with a clean-out plug 4, the other end of the supply tank 1 carrying a gage glass 5. Below the supply tank 1 is a distillation tank 6. A pipe 7 forms a communication between the supply tank 1 and the distillation tank 6, and enters the distillation tank, the pipe 7 carrying at its upper end, a valve seat 8 located within the supply tank 1. Coöperating with the valve seat 8 is an upwardly opening valve 9 pivotally connected with a rod 10 passing through an opening 11 in the top of the supply tank 1. The upper exposed end of the rod 10 is pivoted eccentrically to a cam 12 adapted to coöperate with the top of the supply tank 1. Mounted to reciprocate on the pipe 7 and located within the distillation tank 6 is a float 14. Pivoted to the float 14 are depending links 15 which, in their turn, are pivoted to the outer ends of levers 16 fulcrumed intermediate their ends on a frame 17 depending on the lower end of the pipe 7. The frame 17 includes a seat 17ᵃ adapted to coöperate with a downwardly closing valve 18 pivoted to the inner ends of the levers 16. At one end, the distillation tank 6 is supplied with a clean out door 19, the other end of the tank carrying a gage-glass 20. In the distillation tank 6 and located near to the top thereof, is a trough or collector 21. A pipe 22 is located exteriorly of the tank 6, and into the pipe 22 the trough 21 discharges. A nozzle 23 enters the pipe 22 at its upper end. A cold water pipe 24 communicates with the nozzle 23 and carries a valve 25. A steam pipe 26 enters the tank 6, and, if desired, comprises a plurality of branches, each of the branches being equipped with perforations 27. Exteriorly of the distillation tank 6, the steam pipe 26 is equipped with a valve 28.

Disposed below the distillation tank 6 is a condenser tank 29 in which is disposed a sinuous conduit comprising a plurality of inclined pipes 30 and headers 31 at the ends of the condenser tank 29. The upper end of the conduit defined by the pipes 30 and the headers 31 communicates with the lower end of the pipe 22. At one end of the condenser tank 29 and adjacent the top thereof is located a water discharge pipe 32. Disposed at the opposite end of the condenser tank 29 and entering the bottom thereof is a water supply pipe 33. Disposed below the condenser tank 29 is an upright separator 34. The upper end of an exterior pipe 35 communicates with the lower end of the sinuous conduit formed in the condenser tank 29 by the pipes 30, the lower end of the pipe 35 entering the separator 34. Disposed within the separator 34 is an upright outer sleeve 36, the upper end of which is secured to the top of the separator. The side of the sleeve 36 which is remote from the pipe 35 is provided near to the top of the separator 34 with an opening 37. Disposed within the outer sleeve 36 is an inner sleeve 38 secured to the top of the separator 34. The inner sleeve 38 has a small air vent 38ᵃ near its top which prevents a siphoning action through the pipe 39 hereinafter mentioned. The lower ends of the sleeves 38 and 36 are spaced apart from the bottom of the separator 34. A water outlet 39 enters the bottom of the separator 34 within the inner sleeve 38. A gasolene outlet pipe 40 projects upwardly through the bottom of the separator 34 and extends between the outer sleeve 36 and the inner sleeve 38, the upper end of the pipe 40 being located at a greater elevation than the upper end of the pipe 39. In the bottom of the separator 34 may be located a clean out plug 41.

Disposed beneath the condenser tank 29 and at the side of the separator 34 is an upright tubular receiver 42. The receiver 42 is supplied with a gage glass 43, and with a drain 44 including a valve 45. At one side and intermediate its ends, the receiver 42 is provided with a sampling cock 46. Access may be had to the receiver 42 by means of a plug 47. A pipe 48 enters the distillation tank 6, adjacent the bottom thereof, and leads to the receiver 42, the pipe opening into the receiver at a point near the top of the receiver.

The structure above described may be mounted upon a suitable frame 49, indicated in Fig. 1 of the drawings, but broken away, in order that the essential features of the invention may not be obscured, the specific structure of the frame being immaterial, should it be necessary to use a frame at all.

The practical operation of the device is as follows:—

Gasolene is permitted to flow into the tank 1 through the inlet 2, the cam lever 12 being manipulated to raise the rod 10 and the valve 9, whereupon the gasolene will flow into the distillation tank 6 and by the pipe 48 into the receiver 42, until the latter is filled with impure gasolene. Subsequently the impure gasolene rises in the distillation tank 6 until the float 14 rises and closes the valve 18. The hand valve 9 is used only when the valve 18 fails to operate automatically.

Steam is introduced into the distillation tank 6 by way of the pipe 26, the steam passing outwardly into the distillation tank, through the perforations 27, in the pipe. The steam thus introduced into the tank 6, converts the gasolene therein into a moist vapor. The most of the dirt and other impurities remain in the tank 6. The gasolene vapor in the tank 6 passes by way of the collecting trough 21 into the pipe 22. By means of the nozzle 23 water is introduced into the upper end of the pipe 22. This water, which is cold, exercises two functions. First, it serves to wash the vapor, and, secondly it creates a diminution of pressure in the pipe 22, so that there is a tendency for the gasolene vapor to be sucked into the pipe 22, from the tank 6, by way of the trough 21.

From the pipe 22, the gasolene vapor passes into the sinuous conduit formed in the tank 29 by the pipes 30. The gasolene vapor is condensed by the water which has been admitted into the tank 29 through the water supply pipe 33. This condensation of the vapor further reduces the pressure in the pipe 22 and tends to create a suction through the pipe 22. From the lower end of the conduit formed by the pipes 30, gasolene flows through the pipe 35 into the separator 34. Dirt and impurities which remain in the gasolene, tend to gravitate at the bottom of the separator 34. The separator 34 contains water which stands as high as the top of the pipe 39. In the separator 34, the gasolene is compelled to traverse a roundabout path on two streams on top of the water, the gasolene moving in opposite directions around the outside of the outer sleeve 36, and passing into the space between the sleeves 36 and 38 through the opening 37. The gasolene ultimately leaves by way of the pipe 40, in a clean condition. As the level of impure gasolene within the distillation tank 6 is lowered, the float 14 moves downwardly, opening the valve 18 and permitting impure gasolene to flow from the supply tank 1 into the tank 6. The operation of the device, therefore, is practically continuous.

The water of condensation from the steam emitted by the steam pipe 26 is received by the tank 6, the water of condensation flowing by way of the pipe 48 into the receiver 42 which is filled with impure gasolene. The impure gasolene in the receiver 42 is replaced by water, the impure gasolene rising through the pipe 48 into the tank 6. The cock 46 may be opened, to permit a sampling of the contents of the receiver 42.

The distillation tank 6, the condenser 29 and the separator 34 are of primary importance. It is desirable to use also the supply tank 1 and the receiver tank 42 to secure the most perfect results, but, if desired, either the supply tank 1 or the receiver 42, or both of them, may be omitted at the will of the user.

The process which I desire to protect comprises some or all of the following steps in combination:—filling the receiver 42 with impure liquid and automatically replacing the water of condensation in the tank 6 by impure liquid from the tank 42; controlling the supply of impure liquid from the tank 1 to the tank 6 by the float-controlled valve 18; vaporizing the impure liquid in the tank 6 by steam from the pipe 16; introducing water into the vapor by means of the nozzle 23; condensing the vapor in the tank 29; and separating the condensate from the water in the tank 34.

Having thus described the invention, what is claimed is:—

The herein described process of purifying gasolene and similar hydrocarbon cleaning liquids, which consists in accumulating two bodies of impure liquid; and introducing steam into one of said bodies to vaporize the same and to produce water of condensation; condensing the vapor; and effecting an interchange between the water of condensation and the other of said bodies of liquid.

In testimony that I claim the foregoing as my own, I have hereto affixed my signature in the presence of two witnesses.

JOHN J. TOKHEIM.

Witnesses:
MILNER A. PALOUSKY,
W. M. KACENA.